June 11, 1957 — D. J. PIKOSKY — 2,795,167
MICROSCOPIC COMPARATOR
Filed March 25, 1953 — 3 Sheets-Sheet 1
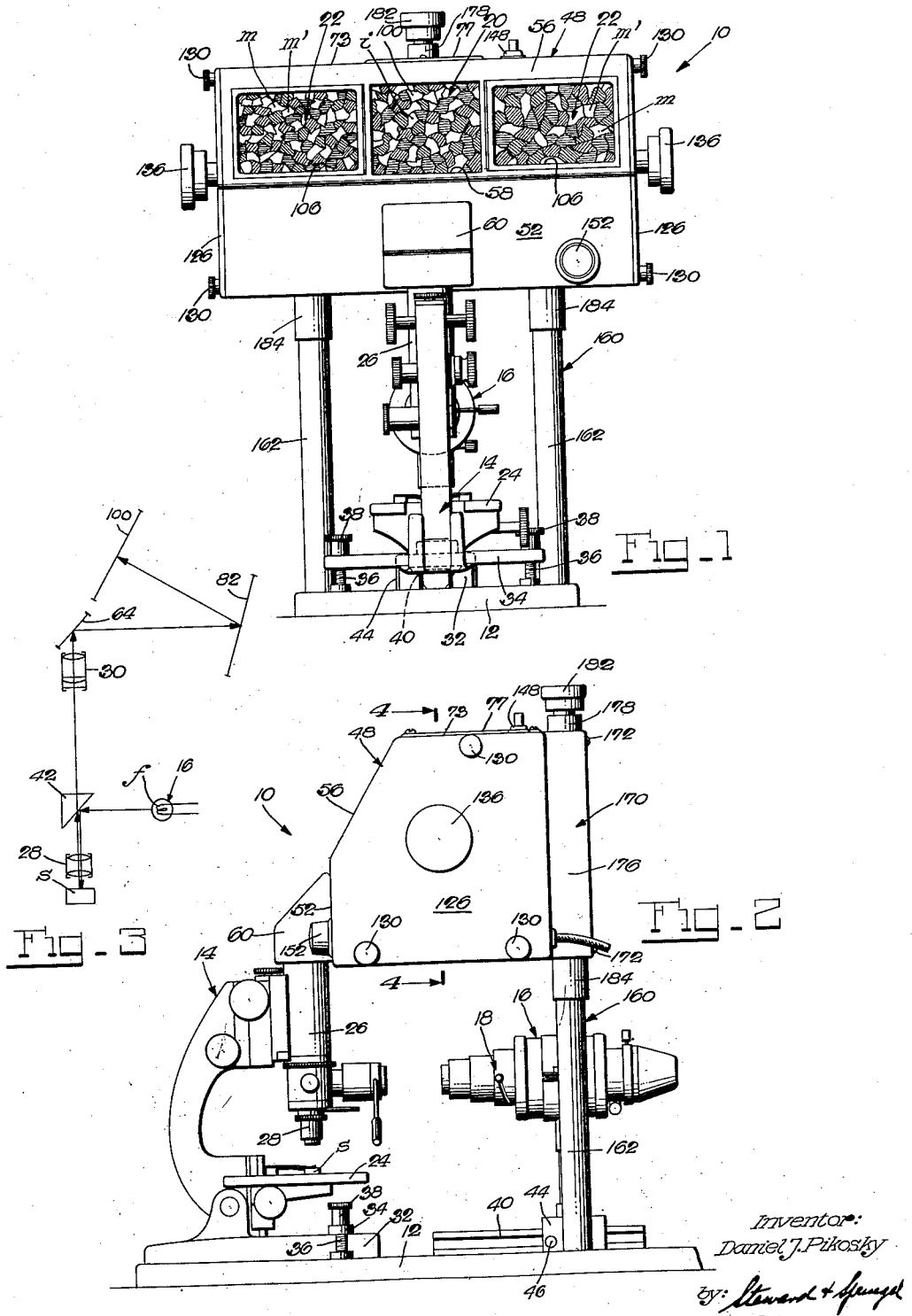
Inventor:
Daniel J. Pikosky
by Stewart & Spruegel
Attorneys.

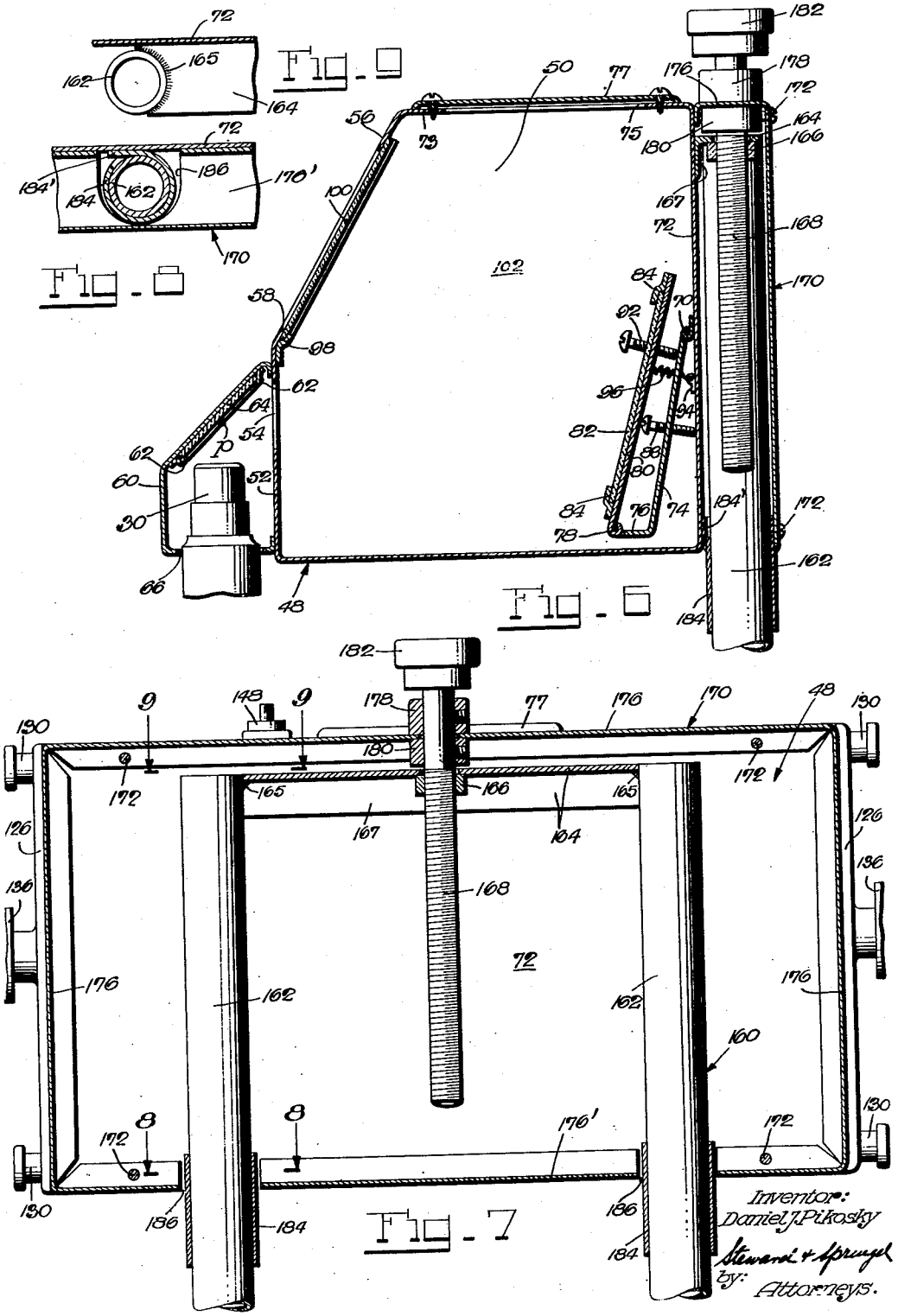

United States Patent Office 2,795,167
Patented June 11, 1957

2,795,167

MICROSCOPIC COMPARATOR

Daniel J. Pikosky, Hamden, Conn.

Application March 25, 1953, Serial No. 344,588

11 Claims. (Cl. 88—24)

This invention relates generally to comparators, and more particularly to comparators of the type used for simultaneous examination of magnified images of objects and micrographs of standard specimens of such objects.

It is an object of the present invention to provide a comparator of this type in which the magnified image of a specimen being examined is projected from a microscope onto a rear projection screen next to a micrograph for ready comparison of the projected image with the micrograph with the least discomfort to the viewer, and for immediate and most accurate evaluation of the physical characteristics of the specimen.

It is another object of the present invention to provide a comparator of this type in which the projection screen is flanked on both sides by micrographs which denote standard grades, respectively, of the characteristics of a specimen, thereby to enable a viewer to evaluate immediately and with great accuracy the true grade of the specimen being tested on visually comparing its projected image with the adjacent micrographs.

It is a further object of the present invention to provide in a comparator of this type and on opposite sides of the projector screen thereof turrets which carry micrographs of the different standard grades within the accepted range of the grain size, for instance, of a given specimen material, of which each turret is individually turnable to bring any micrograph thereon next to and into common view with the projector screen and the micrographs of successive standard grades are carried by the opposite turrets, respectively, so that any specimen may quickly and accurately be graded on simply turning either or both turrets until the micrographs on both turrets which most nearly resemble the projected image of the specimen being tested are in common view with the projector screen.

Another object of the present invention is to provide a comparator of this type of which the micrograph or micrographs are transparencies and are illuminated from the rear so as to have the same general appearance to the viewer as the magnified image of a specimen on the rear projection screen, thereby further facilitating the viewer's task of evaluating the desired characteristics of the specimen being tested, and especially structural characteristics of the same, such as grain size, for instance.

A further object of the present invention is to provide a comparator of this type of which the aforementioned micrographic transparency or transparencies are illuminated with light of variable intensity, so that the micrographs may be made to resemble the magnified image of a specimen on the rear projection screen to such an extent that the only apparent differences between the image and the micrographs are those between the structural characteristics of the specimen and the structural characteristics denoted by the micrographs.

It is another object of the present invention to provide a comparator of this type of which the aforementioned rear projection screen and turrets are provided in adjacent dark chambers or compartments in a housing in such manner that the screen covers a window in the middle chamber and the micrograph on each turret which is presently in common view with the screen substantially covers a window in the respective outer chamber next to the window in the middle chamber.

It is a further object of the present invention to provide a comparator of this type of which the first stage magnification of a specimen is accomplished by a microscope, and the aforementioned housing carries at the exit pupil of the microscope a reflector which forms part of the image projection system that casts the image of the specimen at even larger magnification onto the rear of the projection screen.

Another object of the present invention is to provide a comparator of this type which has provisions for removably mounting microscopes of different makes and of different sizes and powers within limits and for properly coordinating any mounted microscope with the image projection system of the comparator, and further provisions for adjusting the image projection system for the required additional magnification of the projected image on the screen so that the latter image will have the same magnification as the standard micrograph or micrographs with which it is to be compared, permitting thereby the manufacture and sale of the present comparator with or without a microscope, and in the case of a comparator sold without a microscope installation of a microscope of the purchaser's own possession or choice.

It is a further object of the present invention to provide a comparator of this type of which the housing is vertically adjustable relative to the microscope, thereby to facilitate the task of accurately adjusting the aforementioned reflector on the housing to the exit pupil of the microscope on initial set-up of the comparator, and also to permit readjustment of this reflector to the exit pupil of the microscope on adjustment of the tube thereof or on replacement of the microscope with another microscope of a different tube length.

It is another object of the present invention to provide a comparator of this type of which the image projection system comprises, besides the aforementioned rear projection screen and the first reflector, a second reflector which is pivotally mounted in the projection chamber in the housing and is in any position in image-receiving relation with the first reflector, and which is also angularly adjustable for its ready positioning in accurate image-projecting relation with the projection screen.

A further object of the present invention is to provide a comparator of this type of which the aforementioned second reflector of the image projection system is pivotally mounted at one end of a support which is, in turn, pivotally mounted at its other end in the projection chamber in the housing, and the second reflector and its support are separately angularly adjustable relative to each other, permitting thereby bodily movement of the second reflector toward and away from the first reflector and projection screen for the purpose of varying the magnification of the image projection system, and permitting also angular adjustment of the second reflector into image-projecting relation with the projection screen during or after bodily movement of the second reflector into a desired position of magnification.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a front view of a comparator embodying the present invention;

Fig. 2 is a side view of the same comparator;

Fig. 3 is a diagram of the optical system of the comparator;

Figure 4:
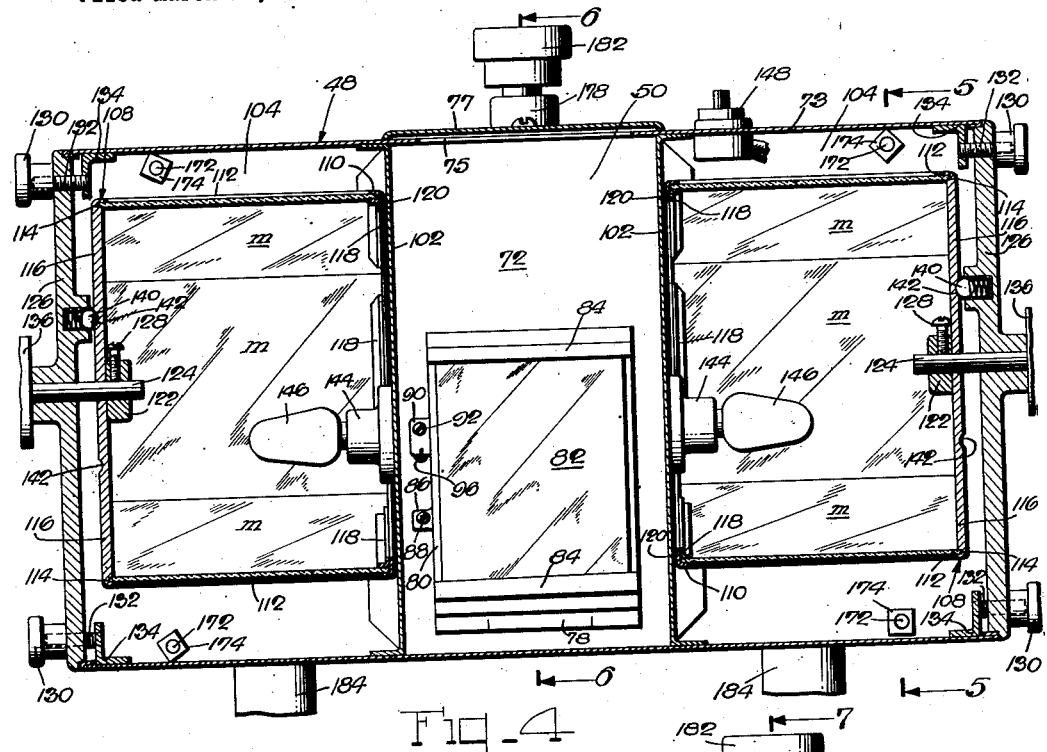
Fig. 4 is an enlarged fragmentary section through the comparator as taken on the line 4—4 of Fig. 2.
Figure 5:
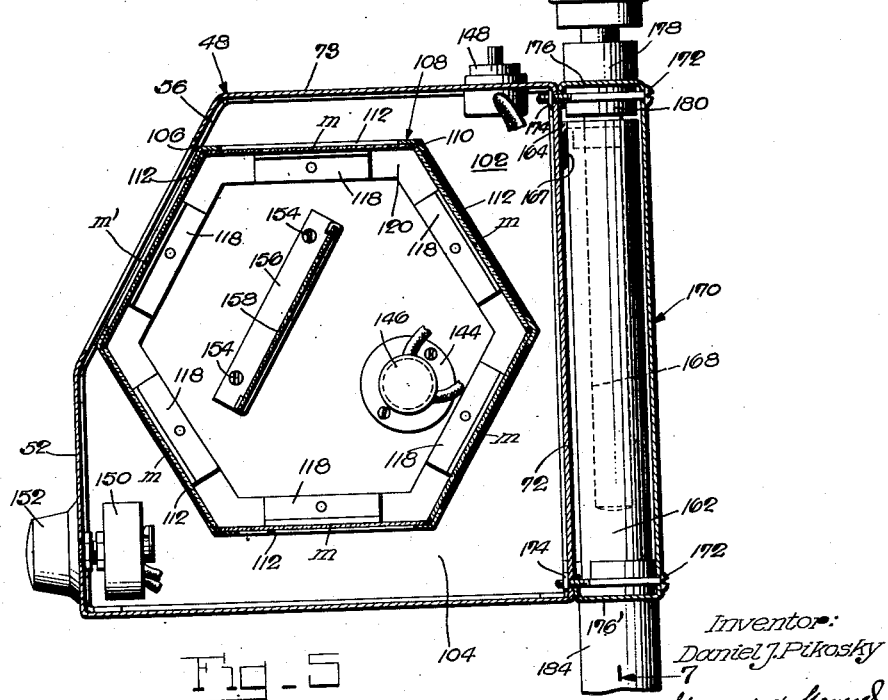

Figs. 5 and 6 are fragmentary sections through the comparator as taken on the lines 5—5 and 6—6, respectively, of Fig. 4;

Fig. 7 is a fragmentary section through the comparator as taken on the line 7—7 of Fig. 5; and Figs. 8 and 9 are fragmentary sections taken on the lines 8—8 and 9—9, respectively, of Fig. 7.

Referring to the drawings, and more particularly to Figs. 1 and 2 thereof, the reference numeral 10 designates a comparator which comprises a base 12, a microscope 14, a high-intensity filament lamp 16 with an adjustable condenser 18, a projection system 20, and comparison means 22.

The microscope 14, which may be of any standard make, has a vertically adjustable stage 24 for a specimen s, and a tube 26 which is preferably also vertically adjustable. Fig. 3 diagrammatically illustrates at 28 and 30 the usual objective and ocular, respectively, of the microscope. The microscope 14 may suitably be mounted on the base 12 of the comparator. In the present instance, the microscope is removably mounted on the base 12 by means of a cross-bar 34, anchor bolts 36 which project from the base 12 through the cross-bar 34, and nuts 38 which are threadedly received by the bolts 36 and which, on being tightened, draw the cross-bar 34 firmly into clamping engagement with the microscope base 32 (Figs. 1 and 2).

The base 12 of the comparator is provided with a dove-tail guide 40 for movement of the lamp 16 toward and away from the vertical illuminator 42 in the microscope tube (see Fig. 3). More particularly, the base 44 of the lamp 16 is received by the guide 40 and may be clamped by a screw 46 to the latter in any adjusted position of the lamp relative to the vertical illuminator 42. The lamp 16 is also vertically adjustable in any suitable manner on its base 44 for proper alignment of the filament f of the lamp with the vertical illuminator in the vertically adjustable tube of the microscope (Fig. 3). The lamp 16 may be of any conventional make and, therefore, requires no further description.

Reference is now had to Figs. 1, 2 and 6 which show the projection system 20 of the comparator. Thus, there is mounted above the base 12, in a manner described hereinafter, a housing 48 having a dark projection chamber 50 (Fig. 6) which is provided in its front wall 52 with an aperture 54. The front wall 52 of the chamber 50 and of the entire housing 48 continues as an upwardly and rearwardly slanting panel 56 which is provided with a window 58 within the confines of the projection chamber 50. Suitably carried by the front wall 52 of the chamber 50 is a hood 60 in which is mounted at 62 a reflector 64 (Fig. 6). The hood 60 is further provided in its bottom with an opening 66 through which the ocular 30 of the microscope 14 may be extended into a position to bring the exit pupil p of the microscope, i. e., the magnified image formed by the microscope of the specimen s, into the plane of the reflector 64. The reflector 64 is arranged at such an angle, 45 degrees from the horizontal in the present instance, as to reflect the microscopic image of the microscope through the aperture 54 into the projection chamber 50 (Fig. 6).

Suitably hinged at 70 on the rear wall 72 of the projection chamber 50 is the upper end of a support plate 74 (Fig. 6) which at its lower end has a forwardly projecting flange 76 to which is hinged at 78 the lower end of a mounting plate 80 for another reflector 82. The reflector 82 may be secured to the mounting plate 80 through intermediation of suitable gibs 84. Bearing with its end against the rear wall 72 of the projection chamber 50 and threadedly received in a side lug 86 on the support plate 74 is a screw 88 (Figs. 4 and 6) which may be turned to swing the support plate 74 and the mounting plate 80 thereon toward and away from the rear wall 72 of the projection chamber 50. Bearing with its end against the support plate 74 and threadedly received in a side lug 90 on the mounting plate 80 is another screw 92 (Figs. 4 and 6) which may be turned to swing the mounting plate 80 and the reflector 82 thereon toward and away from the support plate 74. Anchored with its ends to the side lug 90 on the mounting plate 80 and to a bracket 94 on the rear wall 72 of the projection chamber 50 is a tension spring 96 (Fig. 6) which normally draws the mounting plate 80 with its adjustment screw 92 into engagement with the support plate 74, and also draws the latter with its adjustment screw 88 into engagement with the rear wall 72 of the projection chamber 50. It appears from Fig. 6 that the reflector 82 is in any of its angular positions on the support plate 74 in image-receiving relation with the reflector 64.

Held in covering relation with the window 58 in the projection chamber 50 by means of any suitable frame 98 on the slanting panel 56 is a rear projection screen 100 against which the image formed by the microscope of the specimen s is to be cast in the form of an even greater magnified image i (Fig. 1). To this end, the mounting plate 80 is angularly adjusted on the support plate 74 until the reflector 82, which in any angular position is in image-receiving relation with the reflector 64, is also in image-projecting relation with the rear projection screen 100. For ready access to the adjustment screws 88 and 92 for their manipulation, the top wall 73 of the housing 48 is provided with an aperture 75 which is normally covered by a removably mounted plate 77.

The projection chamber 50 is provided in the housing 48 by two spaced partitions 102 therein which divide the housing into two further outer chambers 104, respectively (Figs. 4 and 5). The slanting panel 56 of the housing 48 is within the confines of the outer chambers 104 provided with windows 106, respectively, which in dimensions may be similar to those of the window 58 and lie next to and on opposite sides, respectively, of the latter in the fashion shown in Fig. 1. The windows 106 serve for viewing, from the front of the comparator (Fig. 1), the hereinbefore mentioned comparison means 22 side-by-side with the projected image i on the rear projection screen 100. The comparison means 22 are micrographs m. In the present instance, there are provided in each of the outer chambers 104 a plurality of micrographs m each of which may be brought into viewing relation with the projected image i on the rear projection screen 100. To this end, the micrographs in each outer chamber 104 are carried by a turret 108 (Figs. 4 and 5). Each turret 108 is of general cup-shape and has, in the present instance, a hexagonal rim 110 for holding six micrographs m. The rim 110 of each turret is in each of its sides provided with an aperture 112 for exposure of a micrograph m. Each micrograph m may be received with one end in a slot 114 in the bottom 116 of the respective turret (Fig. 4), and may be held with its other end against the adjacent side of the turret by a preferably removable angle strap 118 on the inwardly flanged end 120 of the rim 110 of the turret.

The bottom 116 of each turret 108 is provided with a central hub 122 for the reception of a stub shaft 124 which is journalled in an end plate 126. Each of the turrets 108 is normally held by a set screw 128 on its respective stub shaft 124 for rotation therewith. The turret-carrying end plates 126 are mounted on the housing 48 in covering relation with the open ends of the outer chambers 104 therein by means of nuts 130 which are received by threaded studs 132 on angles 134 that are mounted in the housing 48 near the opposite ends thereof. The stub shafts 124 carry on the outside of their respective end plates 126 knobs 136 (see also Figs. 1 and 2) with which to turn the respective turrets in the outer chambers 104 in the housing independently of each other for bringing any of the micrographs into viewing position in the adjacent windows 106 in the slanting panel 56 of the housing (Figs. 1 and 5). The presently exposed micrographs m' (Figs. 1 and 5) are in substantial covering relation with the adjacent windows 106 in the outer chambers 104, wherefore the latter are to all intents and purposes dark chambers. In order releasably to hold each turret 108 in any of its angular positions in which a micrograph thereon is in proper viewing position, each end plate 126 is provided with at least one spring-urged plunger 140 preferably in the form of a ball, which yieldingly registers with properly coordinated depressions 142 in the bottoms 116 of the respective turrets.

Since the image i cast onto the rear of the projection screen 100 appears to the viewer in front of the comparator as a rear-illuminated transparency, the micrographs m are, for most accurate comparison with the projected image i on the screen 100, transparencies which are illuminated from the rear. To this end, there is suitably mounted on each partition 102 a lamp socket 144 for a bulb 146 which extends within the confines of the adjacent turret so that its light will illuminate the micrograph transparencies on the latter, including the transparency m' which is presently in viewing position. The bulbs 146 are preferably in series connection with each other and also with a switch 148 on top of the housing 48 for connecting the bulbs with and disconnecting them from a suitable electric power source. Preferably, a variable resistor 150 is also provided in series connection with the bulbs 146 (Fig. 5) to permit regulation of the light intensity of the latter so that the micrograph transparencies m' which are presently exposed for viewing appear to have the same illumination as the projected image i on the rear projection screen 100. The resistor 150 may suitably be mounted on the front wall 52 of the housing 48 in one of the outer chambers 104 therein, and may have a knob 152 on the outside of the housing for convenient operation of the resistor 150. Mounted at 154 on each partition 102 in the housing 48 is a frame 156 (Fig. 5) for holding a light-diffusing plate 158 in the path of the light from each bulb 146 to the adjacent exposed micrograph transparency m'.

The housing 48 is mounted above the base 12 for vertical adjustment. To this end, there is provided on the base 12 an upright support 160 (Figs. 1 and 2) which comprises two spaced columns 162 that are joined at the top by a cross-tie in the form of an angle 164 (Fig. 7). Conveniently, the ends of the angle 164 may be shaped to substantially fit the peripheries of the columns 162, and be welded thereto as at 165 (Fig. 9). The leg 167 of the angle 164 may be in sliding engagement with the rear wall 72 of the housing 48 (Figs. 6 and 9). Brazed or otherwise secured to the cross-tie 164 is a nut 166 which threadedly receives a spindle 168 on a box-like panel 170 which is attached to the rear of the housing 48 by means of bolts 172 and nuts 174 (Figs. 4, 5 and 7). The panel 170 is generally rectangular, and the spindle 168 extends through the topmost of the sides 176 of the panel and is held thereon for vertical movement with, but independent rotation relative to, the panel by means of collars 178 and 180 (Fig. 7). Accordingly, the panel 170 with the attached housing 48 are raised and lowered on the upright support 160 on turning a convenient knob 182 on the spindle 168 in opposite directions. To afford positive guidance of the housing 48 and panel 170 on the upright support 160, the housing 48 carries on its rear wall 72 sleeves 184 (Figs. 1 and 2) in which the upright columns 162 are received with a sliding fit (Figs. 6, 7 and 8). The lower or bottom side 176' of the panel 170 is notched at 186 to clear the columns 162 of the upright support 160 (Figs. 7 and 8). The sleeves 184 may be secured to the rear wall 72 of the housing 48 by having punched-out peripheral portions 184' brazed or otherwise secured to the housing's rear wall 72 (Figs. 6 and 8).

The lamp 16 casts condensed light onto the prism-type vertical illuminator 42 (Fig. 3) which reflects this light onto the specimen s for high illumination of the same. The objective 28 and ocular 30 of the microscope 14 combine to produce in the plane of the reflector 64 an image of first magnification of the illuminated specimen s. This image is reflected onto the reflector 82 which, in turn, projects the image onto the rear projection screen 100 at its second or final magnification. The overall magnification of the projected image i on the rear projection screen is preferably equal, or substantially equal, to the magnification of the micrographs m for most accurate comparative results. This may readily be accomplished since adjustment of the reflector 82 will result in variable further magnification, within limits, of the image as it is projected onto the rear projection screen 100. Let it be assumed, for instance, that the magnifying power of the microscope be 57.5 and that the magnification of the micrographs be 75, the additional magnification of the image formed by the microscope to that of the micrographs may readily be accomplished on projecting this image onto the screen 100 after first adjusting the reflector 82 for proper additional magnification of the image. Of course, the magnification of the projected image i on the screen 100 will be varied on bodily adjustment of the reflector 82 toward and away from the reflector 64 and screen 100. Such bodily adjustment of the reflector 82 is accomplished by angularly adjusting the support plate 74 by means of the screw 88 (Fig. 6). After proper bodily adjustment of the reflector 82 for the desired magnification of the projected image i on the screen 100, the mounting plate 80 is angularly adjusted on the support plate 74 by means of the screw 92 in order to return the reflector 82 into its normal angular position in which to project the image from the reflector 64 onto the screen 100. In order to obtain the projected image i on the screen at exactly the same magnification as that of the micrographs m, several simultaneous or successive angular adjustments of the support and mounting plates 74 and 80 will usually be necessary.

The micrographs m may denote any characteristics whatsoever with which similar characteristics of the specimen s are to be compared by comparison of its projected image on the screen with an adjacent micrograph or micrographs. The comparison of the projected image i on the screen with a micrograph or micrographs m' directly adjacent to and in substantially the same plane as the screen greatly facilitates the viewer's task of accurately evaluating the characteristics of the specimen on the basis of the micrograph or micrographs. This task is even further facilitated by making the micrographs m in the form of transparencies and illuminating them from the rear, so that the same present to the viewer the same general appearance as the projected microscopic image of the specimen on the screen. By permitting variation of the light intensity of the micrograph-illuminating bulbs, the micrographs may even be made to resemble the projected image on the screen to such an extent that the only apparent differences between the image and the adjacent micrographs are those between the characteristics of the specimen and the characteristics denoted by the micrographs.

While the instant comparator would be highly useful even if there were only one rotary turret with micrographs, or even if there were no turret or turrets and there were instead a replaceable micrograph or micrographs exposed behind either or both windows 106, the preferred provision of two rotary turrets is especially advantageous for evaluating certain structural characteristics of a specimen material. Thus, let it be assumed that the specimen s be a certain copper base alloy, for instance, which is to be graded according to its grain size, for example. In that case, all the micrographs m carried by both turrets 108 may denote the different standard grain sizes throughout the accepted range of grades of the same alloy, and micrographs denoting successive standard grades of grain sizes are preferably carried by both turrets, respectively. In so arranging the micrographs on the turrets, it is exceedingly simple to bring into common view with the projected image $i$ on the screen those opposite micrographs $m'$ (Fig. 1) which denote successive standard grades of grain sizes which come closest to the grain size of the specimen as depicted by its projected image on the screen. The projected image $i$ on the screen and the exposed micrographs $m'$ have almost continuity with each other, wherefore even a non-skilled person may quickly and without fail bring into comparative view with the projected image those micrographs whose depicted successive standard grades of grain sizes resemble most nearly the grain size of the specimen as depicted by its projected image on the screen. Moreover, the close proximity of the opposite exposed micrographs $m'$ to the projected image $i$ on the screen therebetween, and the identical, or nearly identical, magnification of the micrographs and of the projected image on the screen, as well as the identical appearance of the exposed micrographs and of the image on the rear projection screen as illuminated transparencies, go far in permitting quick and most accurate grading of the specimen on the basis of the successive standard grade micrographs $m'$ with which the image on the screen is compared.

The construction of the present comparator as a unit with or without a microscope is also highly advantageous. Thus, a comparator unit may be purchased without a microscope and the purchaser may readily install a microscope of his possession or choice. Also, microscopes of most makes and tube lengths have sufficiently similar bases to permit their mounting on the base 12 of the comparator by means of the cross bar 34 and nuts 38. The vertical adjustability of the housing 48 is also highly advantageous, not only to permit ready replacement of a microscope with another microscope of a different tube length, but also to permit vertical adjustment of the tube of an installed microscope whenever this should be necessary or advisable despite the vertical adjustability of the microscope's stage.

While in the present embodiment of the comparator a vertical illuminator is shown for evaluating or determining structural characteristics of non-transparent specimens, it is, of course, fully within the purview of the present invention to use, in lieu of the vertical illuminator, a well-known substage illuminator for transparent specimens to be tested.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A comparator, comprising a microscope with an illuminator for forming an image of a specimen; a projection screen; means for projecting the magnified image of the specimen onto said screen; two rotary turrets on opposite sides, respectively, of said screen; and a plurality of micrographs carried by said turrets so that either micrograph of either turret may be turned next to said screen substantially in the plane of the latter on turning the respective turret, said micrographs denoting the different standard grades, respectively, throughout the accepted range of grades of certain structure characteristics of the specimen material, and micrographs denoting successive grades, respectively, of said certain structure characteristics being carried by said turrets, respectively, for ready grading of the specimen by its projected image on said screen between adjacent micrographs.

2. A comparator as set forth in claim 1, in which said screen is a rear projection screen and said micrographs are transparencies, and there are further provided light sources in said turrets, respectively, to illuminate the transparencies on the respective turrets from the rear.

3. A comparator as set forth in claim 1, in which said screen is a rear projection screen and said micrographs are transparencies, and there are further provided light sources of variable light intensity in said turrets, respectively, to illuminate the transparencies on the respective turrets from the rear.

4. In a comparator, the combination of a housing provided with a partition dividing it into dark chambers having side-by-side arranged windows, respectively; a rear projection screen covering the window of one of said chambers; a rotary turret in the other chamber; a plurality of micrograph transparencies carried by said turret so that any one of said transparencies may, on turning said turret, be brought into a viewing position in which the same is in substantial covering relation with the window in said other chamber; means for projecting a magnified image of a specimen from a microscope onto the rear of said screen; and a light source in said other chamber to illuminate any transparency in said viewing position, said micrograph transparencies denoting different standard structure characteristics of the specimen material for comparison with the specific structure characteristics of the specimen as denoted by the projected image on said screen.

5. In a comparator, the combination of a housing provided with two spaced partitions dividing it into a middle and two outer dark chambers having side-by-side arranged windows, respectively; a rear projection screen covering the window of said middle chamber; a rotary turret in each of said outer chambers; a plurality of micrograph transparencies carried by each of said turrets so that any one of said transparencies may, on turning the respective turret, be brought into a viewing position in which the same is in substantial covering relation with the window in the respective outer chamber; means for projecting a magnified image of a specimen to be tested from a microscope onto the rear of said screen; and light sources in said outer chambers, respectively, to illuminate the transparencies in said viewing positions, said micrograph transparencies denoting the different standard grades, respectively, throughout the accepted range of grades of certain structure characteristics of the specimen material, and micrograph transparencies denoting successive grades, respectively, of said certain structure characteristics being carried by said turrets, respectively, for ready grading of the specimen by its projected image on said screen between adjacent micrograph transparencies.

6. The combination in a comparator as set forth in claim 5, further comprising means for simultaneously and uniformly varying the light intensity of said light sources.

7. A comparator, comprising a microscope with a high intensity illuminator for forming a magnified image of a specimen; a housing provided with two spaced partitions dividing it into a middle and two outer dark chambers having side-by-side arranged windows, respectively; a rear projection screen covering the window in said middle chamber; a first pivoted reflector in said middle chamber; a second reflector carried by said housing in image-receiving relation with said microscope and in image-reflecting relation with said first reflector in any angular position of the latter; a support in said middle chamber on which said first reflector is pivoted and angularly adjustable into image-projecting relation with said screen, said support being adjustable toward and away from said second reflector and screen for bodily movement of said first reflector into positions of different magnification of the projected image on said screen; a rotary turret in each of said outer chambers; a plurality of micrograph transparencies carried by each of said turrets so that any of said transparencies may, on turning the respective turret, be brought into a viewing position in which the same is in substantial covering relation with the window in the respective outer chamber; and light sources in said outer chambers, respectively, to illuminate the transparencies in said viewing positions, said micrograph transparencies having substantially the same magnification as the projected image on said screen and denoting the different standard grades, respectively, throughout the accepted range of grades of certain structure characteristics of the specimen material, and micrograph transparencies denoting successive grades, respectively, of said certain structure characteristics being carried by said turrets, respectively, for ready grading of the specimen by its projected image on said screen between adjacent micrograph transparencies.

8. A comparator as set forth in claim 7, in which said light sources comprise two light bulbs, respectively, in series connection with each other and with a variable resistance for varying the light intensity of said bulbs.

9. A comparator, comprising a microscope with a high intensity illuminator and a vertically adjustable tube for forming a manified image of a specimen; a vertically adjustable housing provided with two spaced partitions dividing it into a middle and two outer dark chambers having side-by-side arranged windows, respectively; a rear projection screen covering the window in said middle chamber; a first reflector carried by said housing and movable into image-receiving relation with said microscope on vertical adjustment of said housing; another reflector in said middle chamber in image-receiving relation and in image-projecting relation with said first reflector and screen, respectively; a rotary turret in each of said outer chambers; a plurality of micrograph transparencies carried by each of said turrets so that any one of said transparencies may, on turning the respective turret, be brought into a viewing position in which the same is in substantial covering relation with the window in the respective outer chamber; and light sources in said outer chambers, respectively, to illuminate the transparencies in said viewing positions, said micrograph transparencies having substantially the same magnification as the projected image on said screen and denoting the different standard grades, respectively, throughout the accepted range of grades of certain structure characteristics of the specimen material, and micrograph transparencies denoting successive grades, respectively, of said certain structure characteristics being carried by said turrets, respectively, for ready grading of the specimen by its projected image on said screen between adjacent micrograph transparencies.

10. In a comparator, the combination of a microscope with a high intensity illuminator and a vertically adjustable tube for forming a magnified image of a specimen to be examined; a vertically adjustable housing having a dark projection chamber with a window; a rear projection screen covering said window; means for projecting the magnified image onto said screen including a first reflector carried by said housing and movable into image-receiving relation with said microscope on vertical adjustment of said housing; another reflector in said chamber in image-receiving relation and in image-projecting relation with said first reflector and screen, respectively; another dark chamber in said housing having another window next to the window in said projection chamber; a rotary turret in said other chamber; a plurality of micrograph transparencies carried by said turret so that any one of said transparencies may, on turning the turret, be brought into a viewing position in which the same is in substantial covering relation with the window in said other chamber; and a light source in said other chamber to illuminate any transparency in said viewing position, the projected image on said screen being adjustable in size to substantially the same magnification as said micrograph transparencies, said transparencies denoting the different standard grades, respectively, throughout the accepted range of grades of certain structure characteristics of the specimen material.

11. The combination in a comparator as set forth in claim 10, in which said other reflector is adjustable toward and away from said first reflector and screen in positions of different magnification of the projected image on said screen.

References Cited in the file of this patent

UNITED STATES PATENTS

| 1,859,035 | Hall | May 17, 1932 |
| 2,185,926 | Sinecal | Jan. 2, 1940 |
| 2,518,240 | Lowber | Aug. 8, 1950 |

FOREIGN PATENTS

| 52,698 | Norway | June 26, 1933 |